United States Patent [19]

Simmons

[11] 4,347,154

[45] Aug. 31, 1982

[54] METHYLENE CHLORIDE STABILIZER FORMULATION FOR USE IN AEROSOLS

[75] Inventor: Robert W. Simmons, Midland, Mich.

[73] Assignee: The Dow Chemical Company, Midland, Mich.

[21] Appl. No.: 199,787

[22] Filed: Oct. 23, 1980

[51] Int. Cl.$^3$ .................. C09K 3/30; C07C 17/42; C23F 11/14
[52] U.S. Cl. ...................... 252/305; 252/90; 252/389 R; 252/392; 252/394; 424/45; 424/47; 570/102; 570/104; 570/109; 570/111; 570/117
[58] Field of Search .............. 252/305, 90, 389 R, 252/392, 394; 424/45, 47; 570/102, 104, 109, 111, 117

[56] References Cited

U.S. PATENT DOCUMENTS

| | | | |
|---|---|---|---|
| 3,898,195 | 8/1975 | Beckers | 570/109 |
| 3,923,912 | 12/1975 | Beckers | 570/117 |
| 4,032,584 | 6/1977 | Irani | 570/111 |
| 4,062,901 | 12/1977 | Lolivier et al. | 252/305 |
| 4,263,464 | 4/1981 | Godfroid et al. | 570/109 |

*Primary Examiner*—Irwin Gluck
*Attorney, Agent, or Firm*—A. C. Aneona

[57] ABSTRACT

Certain substituted succinic acid, e.g., sodium alkenyl succinate, and substituted imidazoline derivatives, e.g., (ethoxypropionic acid) imidazoline, provide corrosion resistance for tin-plated steel and solvent stability to aerosol formulations containing alcohol, methylene chloride and water, which employ a hydrocarbon as the propellant.

2 Claims, No Drawings

METHYLENE CHLORIDE STABILIZER FORMULATION FOR USE IN AEROSOLS

BACKGROUND OF THE INVENTION

Methylene chloride (dichloromethane) has been employed in recent years as a vapor pressure depressant and co-solvent for the pressurizing gases and formulation ingredients in aerosol applications. The presence of aluminum and other alloying metals in the filling equipment and in the aerosol containers has made it necessary to provide stabilizers to prevent attack on the metals and degradation of the solvent. In some applications in which aqueous systems are pressurized for use in aerosol containers, the containers are frequently made of tin-plated steel. Chlorinated solvents, and especially methylene chloride are subject to hydrolysis and degradation and attack the tin plate under such conditions. This property has hindered their use in aqueous aerosols due to the resultant container corrosion. By adding certain inhibiting agents to the chlorinated solvents the corrosive behavior in solvent/water aerosols can be minimized.

A rather significant market exists for aerosols containing water. Incorporation of chlorinated solvents in many of these formulations produce desirable performance properties otherwise absent. Water-containing aerosols many times have solubility problems with active ingredients which are helped by the presence of chlorinated solvents. The chlorinated solvents are also compatible with the hydrocarbon propellants and can be used in partial substitution for these. Water-based aerosols dry quite slowly compared to anhydrous systems and incorporation of methylene chloride enhances the evaporation.

SUMMARY OF THE INVENTION

It has now been found that mixtures of methylene chloride, an alcohol and water together with hydrocarbon propellants, e.g. propane or butane, can be stabilized against metals by adding thereto certain substituted succinic acid and substituted imidazoline derivatives.

DETAILED DESCRIPTION OF THE INVENTION

The following experiments will serve to illustrate the use of various substituted succinic acid and imidazoline derivatives. The compounds contemplated as useful inhibitors in the aerosol formulations of the present invention are designated by succinic acid derivatives having the following formulas:

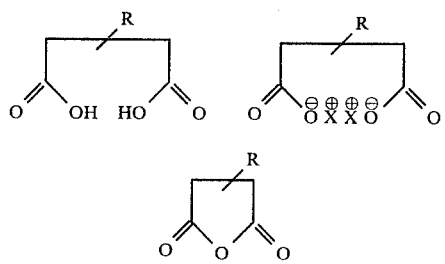

wherein X is sodium, potassium, ammonium or an amino group and R is an alkyl or alkenyl radical having from 3 to 16 carbon atoms.

Also useful are imidazoline derivatives having the formulas:

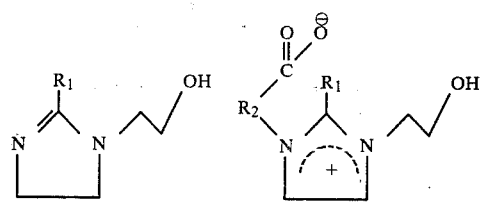

wherein $R_1$ is an aliphatic hydrocarbon radical having from one to twelve carbons and $R_2$ is a divalent hydrocarbon chain having from two to six carbon atoms. The sodium, potassium, ammonium and amine salts of the carboxylic acid derivatives are also useful.

A representative example was conducted as follows: A solvent blend of 12% water, 50.4% ethanol, 20% isobutane, or isobutane-propane mix, and 17.6% Aerothene MM* was used in the following tests. Either 0.25-lb or 0.50-lb tin plate coupons were placed into a Wheaton glass aerosol bottle and charged with the above formulation. Corrosion inhibitors were introduced into this system at 100 ppm and up. Corrosion testing was conducted at 100° F. All percentage compositions are given as weight percents based on total weight of the composition.

*A tradename for an inhibited methylene chloride manufactured by the Dow Chemical Company.

Table I shows the concentration of inhibitor employed, the number of days observed and the degree of corrosion at the end of the observation period. If corrosion occurred in a short period of time, the observation was discontinued. The degree of corrosion is indicated on a scale of 0–5.

TABLE I

| Example No. | Inhibitor** | Conc. (ppm) | Degree* | Time (days) |
|---|---|---|---|---|
| Comparative | None | — | 3 | 5 |
| 1 A | SAS | 5000 | 0 | 40 |
| B | " | | 1 | 97 |
| 2 A | TAS | 100 | 3 | 156 |
| B | | 500 | 2 | " |
| C | | 1000 | 1 | " |
| D | | 2500 | 1 | " |
| E | | 5000 | 0 | " |
| 3 A | MAC | 100 | 4 | 156 |
| B | | 500 | 4 | " |
| C | | 1000 | 3 | " |
| D | | 2500 | 3 | " |
| E | | 5000 | 2 | " |
| 4 A | MAT | 40 | 2 | 140 |
| B | | 100 | 0 | 156 |
| C | | 5000 | 0 | " |
| 5 A | ASA | 100 | 4 | 140 |
| B | | 500 | 3 | " |
| C | | 2500 | 3 | " |
| D | | 5000 | 2 | " |

*0 = none, 1 = very slight, 2 = spotty, 3 = moderate, 4 = heavy
**SAS = sodium alkenyl succinate (alkenyl = $C_6$–$C_9$),
TAS = triethanolamine alkenyl succinate (alkenyl = $C_6$–$C_9$),
ASA = alkenyl succinic anhydride (alkenyl = $C_6$–$C_9$),
MAC = Monazoline C 2-coco-(1-ethoxypropionic acid) imidazoline
MAT = Monateric 1000 2-heptyl-1-(ethoxypropionic acid) imidazoline, sodium salt Certain of the test samples were of a composition typical of an aerosol hairspray. These formulations contained by weight 12% $H_2O$, 47.4% EtOH, 20% hydrocarbon, and 17.6% methylene chloride, and tested in the presence of 0.25-lb tin plate. Corrosion of these samples were monitored at 100° F. and 120° F. using additive concentrations of 100 ppm up to 5000 ppm. Results are shown in Table II (100° F.) and Table III (120° F.).

TABLE II

| Example No. | Inhibitor | Conc. (ppm) | Degree | Time (days) |
|---|---|---|---|---|
| 6 A | TAS | 500 | 2 | 169 |
| B |  | 1000 | 2 | " |
| C |  | 2500 | 1 | " |
| D |  | 5000 | 1 | " |
| 7 A | SAS | 500 | 1 | 169 |
| B |  | 1000 | " | " |
| C |  | 2500 | " | " |
| D |  | 5000 | " | " |
| 8 A | (2-heptyl) | 500 | 2 | 169 |
| B | imidazoline | 1000 | 1 | " |
| C |  | 2500 | " | " |
| D |  | 5000 | " | " |
| 9 A | MAT | 500 | 1 | 169 |
| B |  | 1000 | " | " |
| C |  | 2500 | " | " |
| D |  | 5000 | " | " |
| 10 A | MAC | 500 | 0 | 169 |
| B |  | 1000 | 1 | " |
| C |  | 2500 | " | " |
| D |  | 5000 | 2 | " |
| 11 A | ASA | 500 | 1 | 169 |
| B |  | 1000 | " | " |
| C |  | 2500 | " | " |
| D |  | 5000 | " | " |
| 12 A | (2-lauryl) | 500 | 2 | 169 |
| B | imidazoline | 1000 | " | " |
| C |  | 2500 | 3 | " |
| D |  | 5000 | " | " |

TABLE III

| Example No. | Inhibitor | Conc. (ppm) | Degree | Time (days) |
|---|---|---|---|---|
| Comparative | None | — | 3 | 106 |
| 13 A | SAS | 100 | 4 | 125 |
| in B |  | 500 | 3 | " |
| glass C |  | 1000 | " | " |
| resyn D |  | 2500 | 2 | " |
| E |  | 5000 | " | " |
| 14 A | TAS | 100 | 4 | 89 |
| B |  | 500 | " | " |
| C |  | 1000 | " | " |
| D |  | 2500 | " | 125 |
| E |  | 5000 | " | " |
| 15 A | SAS | 100 | 1 | 106 |
| in B |  | 250 | " | " |
| cans C |  | 500 | " | " |
| resyn D |  | 1000 | 0 | " |
| 16 A | TAS | 100 | 2 | 106 |
| B |  | 250 | " | " |
| C |  | 500 | " | " |
| D |  | 1000 | 1 | " |
| 17 A | MAT | 100 | 2 | 106 |
| B |  | 250 | " | " |
| C |  | 500 | 1 | " |

TABLE III-continued

| Example No. | Inhibitor | Conc. (ppm) | Degree | Time (days) |
|---|---|---|---|---|
| D |  | 1000 | 2 | " |

The Monazoline and Monateric materials indicated in Table I are commercial products of Mona Industries, Inc., New Jersey.

An operable concentration range for the inhibitors is from about 100 ppm to about 1%. While the preferred range is from about 500 ppm to 0.5% (5000 ppm).

Range of alcohol is from about 30 to 70% by wt., for water is from about 0.5 to 15% by wt., the hydrocarbon propellant is from about 18 to 35% by wt. and methylene chloride is from about 1 to 70% by wt.

I claim:

1. A stable aqueous composition containing a hydrocarbon propellant, an alcohol, and methylene chloride wherein the inhibitor is a substituted succinic acid or a substituted imidazoline derivative.

2. An aqueous aerosol composition containing a chlorinated hydrocarbon suitable for use in aerosol spray cans wherein said composition contains an inhibitor against metal corrosion which is selected from the group of substituted succinic acid and substituted imidazoline derivatives having the formulas

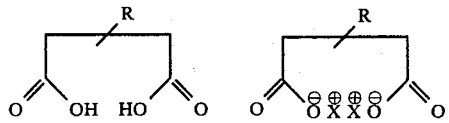

wherein X is sodium, potassium, ammonium or an amino group and R is an alkyl or alkenyl radical having from 3 to 16 carbon atoms, and

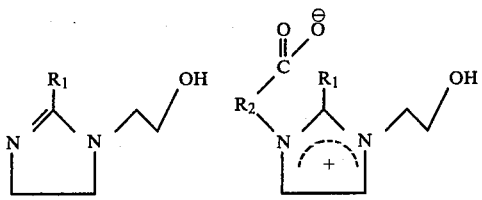

wherein $R_1$ is an aliphatic hydrocarbon radical having from one to twelve carbons and $R_2$ is a divalent hydrocarbon chain having from two to six carbon atoms, and wherein X, having the above meaning, may be substituted on the carboxyl radical of the imidazoline derivative.

* * * * *